United States Patent Office 3,129,242
Patented Apr. 14, 1964

3,129,242
METHYL 3β,5β-DIHYDROXY-B-NORCHOLESTANE-6β-CARBOXYLATE
Harold Russ Nace, Barrington, R.I., assignor to Richardson-Merrell Inc., a corporation of Delaware
No Drawing. Filed Dec. 28, 1961, Ser. No. 162,913
1 Claim. (Cl. 260—468)

This invention relates to a new and useful B-norsteroid, more particularly methyl 3β,5β-dihydroxy-B-norcholestane-6β-carboxylate, and to a method of preparing the same.

The compound of this invention may be prepared by mild alkaline hydrolysis in methanol of 3β-acetoxy-5β-hydroxy-B-norcholestane-6-carboxylic acid 5,6-lactone. This reaction not only hydrolyzes the 5,6-lactone, but also results in the simultaneous hydrolysis of the 3β-acetoxy group. The preparation of the compound may be illustrated as follows:

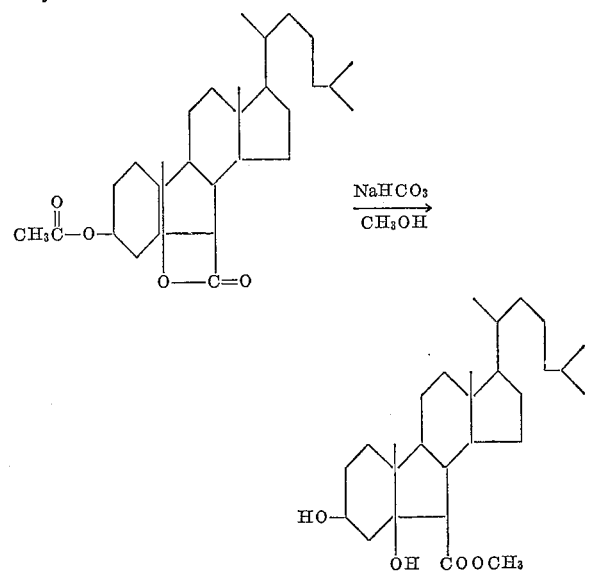

The compound of the present invention has anti-inflammatory activity as evidenced by its ability to inhibit the spreading of intradermally injected India Ink. Hydrocortisone, a known and clinically useful anti-inflammatory agent has a similar type of activity in this test.

The compound of the present invention is active on oral, parenteral or topical administration in dosage levels ranging from 0.02 mgs. to 2 grams depending upon vehicle and route of administration. It has useful therapeutic applications in the prevention and treatment of certain allergic and collagen diseases in which inflammation plays a part.

EXAMPLE I

*Methyl 3β,5β-Dihydroxy-B-Norcholestane-6β-Carboxylate*

To a solution of 250 mg. (0.546 millimole) of 3β-acetoxy-5β-hydroxy-B-norcholestane - 6 - carboxylic acid 5,6-lactone, prepared by the procedure of Boswell (G. A. Boswell et al., Bull. Soc. Chim. France, 1958, 1598), in 50 ml. of methanol was added 1 g. of sodium bicarbonate and the resulting mixture was stirred for 30 hours at room temperature. The mixture was then diluted with 250 ml. of water, extracted with ether, and the ether extract was washed with water, dried over anhydrous sodium sulfate, and then the ether was evaporated. The residue was crystallized from petroleum ether (B.P. 30°–60°) to give 160 mg. (65 percent) of methyl 3β,5β-dihydroxy-B-norcholestane-6β-carboxylate, M.P. 93°–96° C. One recrystallization gave an analytically pure sample, M.P. 97°–97.5° C., $[\alpha]_D$+35.9 (CHCl$_3$).

I claim:
Methyl 3β,5β-dihydroxy - B - norcholestane-6β-carboxylate.

References Cited in the file of this patent

Groggins: Unit Processes in Organic Synthesis, (New York, 1952), pages 616–20.
Boswell et al.: Bull. Soc. Chim., France, 1958, pages 1598–9.